United States Patent
Permuy

(10) Patent No.: US 10,224,829 B2
(45) Date of Patent: Mar. 5, 2019

(54) DRIVE TRAIN COMPRISING A DOUBLY FED ELECTRIC MACHINE AND A BAND STOP FILTER CONNECTED BETWEEN AN INVERTER AND THE ROTOR OF THE MACHINE

(75) Inventor: Alfred Permuy, Rueil-Malmajson (FR)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 192 days.

(21) Appl. No.: 14/009,798

(22) PCT Filed: Apr. 5, 2012

(86) PCT No.: PCT/EP2012/056359
§ 371 (c)(1),
(2), (4) Date: Oct. 4, 2013

(87) PCT Pub. No.: WO2012/136809
PCT Pub. Date: Oct. 11, 2012

(65) Prior Publication Data
US 2014/0036553 A1 Feb. 6, 2014

(30) Foreign Application Priority Data
Apr. 5, 2011 (FR) ...................... 11 52940

(51) Int. Cl.
*H02H 7/06* (2006.01)
*H02M 5/44* (2006.01)
(Continued)

(52) U.S. Cl.
CPC ................ *H02M 5/44* (2013.01); *H02H 7/06* (2013.01); *H02J 3/386* (2013.01); *H02P 9/007* (2013.01); *Y02E 10/763* (2013.01)

(58) Field of Classification Search
CPC ... H02P 9/44; H02P 9/04; H02M 5/40; H03H 7/00
(Continued)

(56) References Cited

U.S. PATENT DOCUMENTS 4,080,559 A * 3/1978 Wright ..................... H02H 7/06
322/25
6,486,639 B1 * 11/2002 Montret .................. H02P 9/007
322/22
(Continued)

FOREIGN PATENT DOCUMENTS

CN        101299540 A        11/2008

OTHER PUBLICATIONS

Martinez de Alegria, "Grid Connection of Doubly Fed Induction Generator Wind Turbines; A Survey", 2004.
(Continued)

*Primary Examiner* — Muhammad S Islam
(74) *Attorney, Agent, or Firm* — Wood IP LLC

(57) ABSTRACT

A drive train comprising an electric machine including a rotor and a stator, the stator being electrically connected to an alternating grid and having a stator frequency, and a bidirectional system for converting an alternating current into another alternating current. The conversion system is connected between the grid and the rotor, and comprises an ac/dc converter connected to the network, and an inverter connected between the ac/dc converter and the rotor, the inverter and the rotor being interconnected at an intermediate point for each phase of the alternating voltage. The drive train comprises a band-stop filter for a target interval of between 0.6 times the stator frequency and 1.4 times the stator frequency, said band-stop filter being connected (Continued)

between the intermediate points and attenuating the voltage at the intermediate point for the frequencies of the target interval.

9 Claims, 2 Drawing Sheets

(51) Int. Cl.
*H02P 9/00* (2006.01)
*H02J 3/38* (2006.01)
(58) Field of Classification Search
USPC ............... 318/400.3, 767, 700, 599; 361/20
See application file for complete search history.

(56) References Cited

U.S. PATENT DOCUMENTS

| | | | | |
|---|---|---|---|---|
| 7,411,309 | B2* | 8/2008 | Hudson | F03D 7/0272 |
| | | | | 290/44 |
| 2003/0169109 | A1* | 9/2003 | Chou | H02J 3/01 |
| | | | | 330/149 |
| 2006/0113800 | A1* | 6/2006 | Willisch | H02P 9/007 |
| | | | | 290/44 |
| 2006/0244265 | A1* | 11/2006 | Ichinose | F03D 7/026 |
| | | | | 290/44 |
| 2007/0069677 | A1* | 3/2007 | MacKay | H02P 6/182 |
| | | | | 318/400.27 |
| 2007/0177314 | A1 | 8/2007 | Weng | |
| 2008/0143111 | A1* | 6/2008 | Ichinose | F03D 9/003 |
| | | | | 290/44 |
| 2010/0117605 | A1 | 5/2010 | Kretschmann | |
| 2011/0187480 | A1* | 8/2011 | Schierling | H03H 1/00 |
| | | | | 333/173 |
| 2012/0068655 | A1* | 3/2012 | Inuduka | H02M 1/126 |
| | | | | 318/494 |
| 2013/0181643 | A1* | 7/2013 | Feng | H02P 27/06 |
| | | | | 318/400.3 |

OTHER PUBLICATIONS

Yao et al., "An Improved Control Strategy of Limiting the DC-Link Voltage Fluctuation for a Doubly Fed Induction Wind Generator" IEEE Transactions on Power Electronics, vol. 23, No. 3, pp. 1205-1213, May 2008.
PCT International Search Report from corresponding PCT Application No. PCT/EP2012/056359, dated Jul. 27, 2012.
Unofficial English Translation of Chinese Office Action issued in connection with corresponding CN Application No. 201280017391.7 dated Apr. 1, 2015.

* cited by examiner

DRIVE TRAIN COMPRISING A DOUBLY FED ELECTRIC MACHINE AND A BAND STOP FILTER CONNECTED BETWEEN AN INVERTER AND THE ROTOR OF THE MACHINE

CROSS-REFERENCE TO RELATED APPLICATIONS

This is a national stage application under 35 U.S.C. § 371(c) of prior-filed, PCT application serial number PCT/EP2012/056359, filed on Apr. 5, 2012, which respectively claims priority to French patent application serial number 1152940, filed on Apr. 5, 2011, the entire contents of which are incorporated by reference herein.

BACKGROUND OF THE INVENTION

Field of the Invention

Embodiments of the present invention relate to a drive train designed to be connected to an AC electric grid and including: an electric machine with a stator and a rotor, the stator being designed to be electrically connected to the alternating grid and having a stator frequency, a bidirectional system for converting one alternating electric current to another alternating electric current, designed to be connected between the alternating grid and the rotor of the electric machine, the bidirectional conversion system including: a bidirectional converter for converting from alternating current to direct current, designed to be connected to the alternating grid, a bidirectional inverter for converting from direct current to alternating current between the AC/DC converter and the rotor, the DC/AC inverter having controllable electronic switches designed to convert direct voltage into alternating voltage, the DC/AC inverter and the rotor being connected to each other at an intermediary point for each phase of the alternating voltage, and a device for controlling the switches of the DC/AC inverter according to a control law.

Embodiments of the present invention also relate to a setup for generating electric power to an alternating electric grid, the setup including a turbine and such a drive train connected to the turbine, on the one hand, and designed to be connected to the alternating grid, on the other. Embodiments of the present invention can be applied to a wind turbine or to a hydroelectric installation.

Description of Related Art

From the document "Grid connection of doubly fed induction generator wind turbines: a survey", by Martinez de Alegria et al., a drive train of the aforementioned type is known. The drive train is connected to a three phase grid and includes a doubly fed electric machine, the stator of the machine being connected to the three phase grid and the rotor being fed by means of a three phase-three phase converter connected to the three phase grid. The converter comprises an AC/DC converter connected to the three phase grid and a DC/AC inverter connected between the AC/DC converter and the rotor of the machine. When a fault, such as a short circuit, is produced on the three phase grid, the drive train must follow certain rules imposed by the electric grid (from the English grid code), as for example the German electric grid, or yet the English electric grid, in order to allow the grid to override such fault (from the English Fault Ride Through—FRT).

Such a short circuit in the electric grid leads to a significant increase in the induction voltage to the rotor of the electric machine. The aforementioned document then foresees various solutions to avoid deterioration of the drive train, and, in particular, the converter, as a consequence of this increase in the induction voltage, while complying with the rules of the electric grid in question. Many solutions are foreseen, such as adding a protective device against excess voltage and/or excess current connected between the output terminals of the DC/AC inverter from the alternating side, or even adding thyristors connected in anti-parallel between the electric grid and the stator of the machine for each phase of the alternating current. One solution is to add the protective device against excess voltage and/or excess current in combination with a rotor flow check device by means of a special control for the converter connected between the rotor and the grid.

However, these various solutions require attaching to the doubly fed electric machine an additional active protective device, such as a protective device against excess voltage and/or excess current, or thyristors connected in anti-parallel between the electric grid and the stator of the machine; such a device is expensive.

BRIEF SUMMARY OF THE INVENTION

Embodiments of the present invention propose a drive train intended to be connected to an alternating electric grid and complying with the rules of this grid in case of a fault on the grid, such as a short circuit, while not requiring such an additional active protection device.

Embodiments of the present invention provide a drive train of the aforementioned type, characterized by the fact that it includes, in addition, a band-stop filter for a target interval of between 0.6 times the stator frequency and 1.4 times the stator frequency, the band-stop filter being connected between the intermediate points, and designed to attenuate the voltage at the intermediate point for the frequencies of the target interval.

According to other embodiments, the drive train includes one or more of the following characteristics, taken separately or according to all of the technically possible combinations:

the target interval is between 0.7 times the stator frequency and 1.3 times the stator frequency, or, in an embodiment, between 0.9 times the stator frequency and 1.1 times the stator frequency, or, in an embodiment, between 0.95 times the stator frequency and 1.05 times the stator frequency; the band-stop filter is a passive filter; the band-stop filter includes a plurality of branches, each branch comprising an electromagnetic coil and a condenser connected in series;

each branch also comprises a resistor connected in parallel for each electromagnetic coil;

the control law is such that the alternating voltage coming from the DC/AC inverter is, for frequencies of the target interval, controlled at an amplitude voltage more or less equal to that of the attenuated voltage at the intermediate point and more or less in phase with the voltage coming from the rotor;

the drive train also includes a first sensor for measuring the direct voltage between the AC/DC converter and the DC/AC inverter and a second sensor for measuring the attenuated alternating voltage at the intermediate point, and the control device includes means of servo-control, for the frequencies of the target interval, of the alternating voltage coming from the DC/AC inverter;

the DC/AC inverter is directly connected to the AC/DC converter by a direct current circulation bus, in the absence of a brake chopper connected to the circulation bus of the direct current; and the DC/AC inverter is directly connected between the AC/DC converter and the rotor, in the absence of a protective device against excess voltage and or excess current connected between the intermediate points.

Embodiments of the present invention provide a setup for generating electric power to an alternating electric grid, the setup including a turbine and a drive train connected to the turbine, on the one hand, and designed to be connected to the alternating grid, on the other hand, characterized by the fact that the drive train is as defined above, the electric machine being a generator connected to the turbine, and the stator of the generator being designed to be connected to the alternating grid.

BRIEF DESCRIPTION OF THE DRAWINGS

These characteristics and advantages of the invention will appear when reading the following description, given solely by way of example, and referred to in the attached drawings, in which.

DETAILED DESCRIPTION OF THE INVENTION

Figure 1:
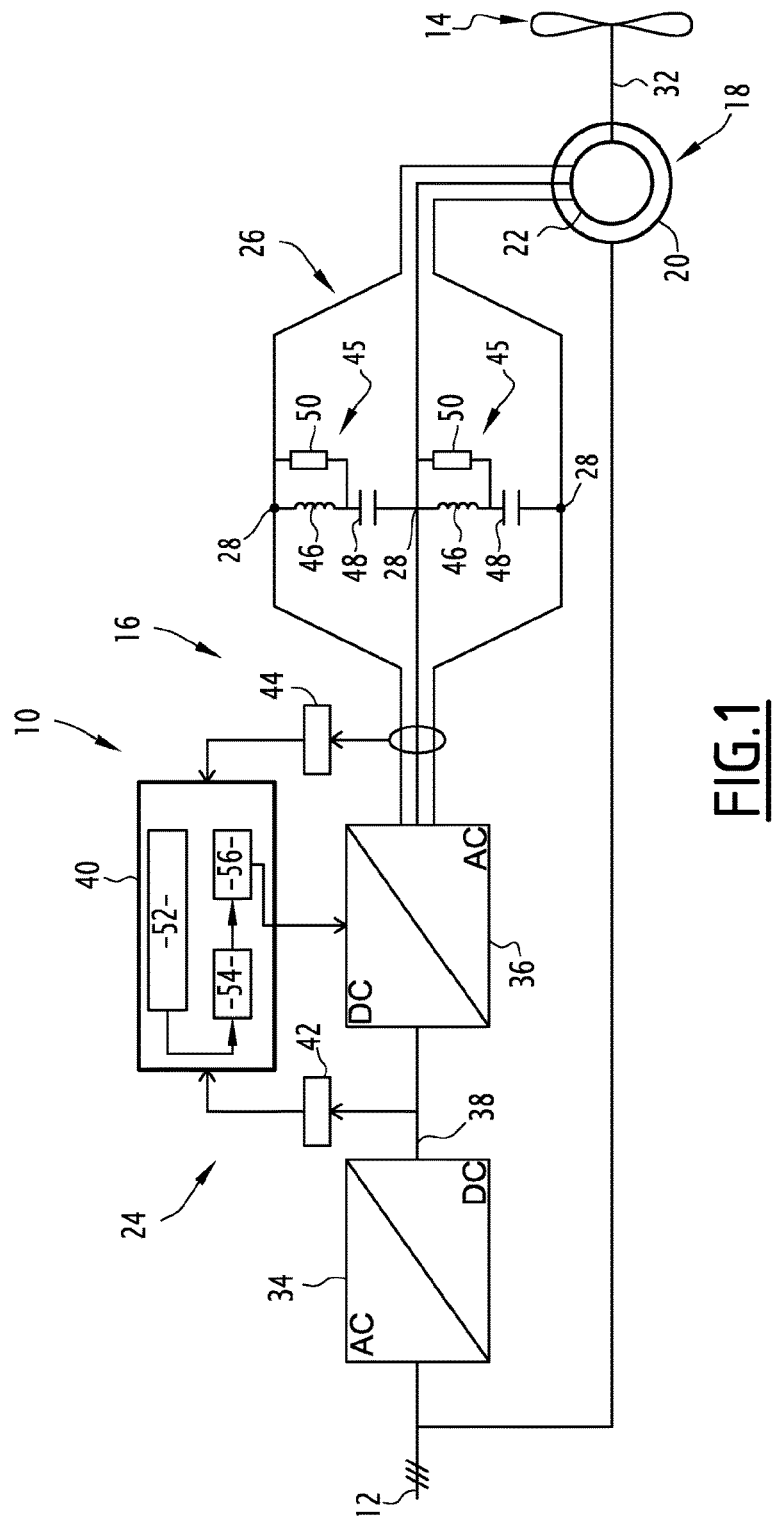
FIG. 1 is a schematic representation of a setup for generating electric power, including a drive train designed to be connected to an alternating electric grid according to an embodiment of the present invention.

In FIG. 1, one setup 10 for generating electric power to an alternating electric grid 12 includes a turbine 14 and a drive train 16 connected to the turbine, on the one hand, and connected to the alternating grid, on the other hand.

The setup for generating electric power 10 is, for example, a wind turbine.

A variant of the setup for generating electric power is a hydroelectric installation.

The alternating electric grid 12 is, for example, a three phase grid of a frequency more or less equal to 50 Hz. In an embodiment, the frequency of the alternating grid at more or less equal to 60 Hz.

The electric grid 12 presents, for example, voltage in the order of 1 kV in the case of a wind turbine. In an embodiment, the electric grid presents voltage in the order of 33 kV in the case of a hydroelectric installation.

The alternating grid 12 is usually connected to a high-voltage grid by means of a voltage transformer, not shown. The high-voltage grid presents, for example, voltage in the order of 33 kV in the case of a wind turbine. In an embodiment, the high-voltage grid presents voltage in the order of 100 kV in the case of a hydroelectric installation.

Each piece of electric equipment connected to the alternating grid 12 must fulfill the performance rules when a fault occurs on the grid 12, such as a short circuit, so as not to cause cascading faults on the grid 12. By way of example, the rules of the German electric grid require that the electric equipment be capable of riding through a fault on the grid (from the English Fault Ride Through—FRT) corresponding to a drop in voltage by 15% of the nominal voltage for a period of 300 ms with a return to 80% of the normal voltage after a 3-second period. The rules of other electric grids are similar to those of the German grid.

The drive train 16 includes an electric machine 18 comprised of a stator 20 and a rotor 22, and a bidirectional system 24 for converting one alternating electric current to another alternating current, connected between the alternating grid 12 and the rotor 22 of the electric machine.

The drive train 16 also includes a band-stop filter 26 connected, in a star or in a triangle, between the intermediate points 28 of connection of the conversion system to the rotor for each phase of the alternating current.

The electric machine 18 is an asynchronous machine. In the example of the embodiment in FIG. 1, the electric machine 18 is a generator connected to the turbine 14.

The stator 20 is electrically connected to the alternating grid 12. The stator 20 has a stator current of angular velocity $\omega_{stator}$ and frequency $f_{stator}$, the angular velocity $\omega_{stator}$ being equal to $2\Pi \times f_{stator}$. The frequency of the stator current, also called stator frequency $f_{stator}$, is equal to the frequency of the alternating current of the grid 12. The stator 20 is, for example, connected directly to the alternating grid 12.

The rotor 22 is electrically connected to the conversion system 24. The rotor 22 comprises a shaft 32 mechanically integrated into a shaft of the turbine 14. The shaft 32 of the rotor has an angular velocity $\omega$ and a frequency of mechanical rotation $f_{mech}$, the angular velocity $\omega$ being equal to $2\Pi \times f_{mech}$. A rotor current with a pulsation of $\omega_{rotor}$ and frequency $f_{rotor}$ is designed to circulate in the rotor 22, the rotor pulse being equal to $2\Pi \times f_{rotor}$. The rotor 22 presents pairs P of magnetic poles.

The controlling relation of the asynchronous machine 18 then fulfills the following equation:

$$P \times \omega = \omega_{stator} - \omega_{rotor} \quad (1)$$

In other words, the stator frequency $f_{stator}$ and the frequency of the rotor current, also called rotor frequency $f_{rotor}$, fulfill the following equation:

$$P \times f_{mech} = f_{stator} - f_{rotor} \quad (2)$$

By convention, the rotor frequency $f_{rotor}$ is positive when the power flow through the conversion system 24 is directed from the alternating grid 12 to the electric machine 18, and is negative when the flow of power through the conversion system 24 is directed from the electric machine 18 to the alternating grid 12, the conversion system 24 being bidirectional. When the rotor frequency $f_{rotor}$ is zero, no power flow goes through the conversion system 24, the stator 20 being directly fed through the alternating grid 12 and the frequency of mechanical rotation $f_{mech}$ being equal to the stator frequency $f_{stator}$.

In the case of a wind turbine, the value of the frequency of mechanical rotation $f_{mech}$ multiplied by the number P of pairs of magnetic poles is between 60% and 140% of the value of the stator frequency $f_{stator}$, or, in an embodiment, between 70% and 130% of the value of the stator frequency $f_{stator}$. In other words, the value of the rotor frequency $f_{rotor}$ is between −40% and 40% of the value of the stator frequency $f_{stator}$, or, in an embodiment, between 30% and 30% of the value of the stator frequency $f_{stator}$.

In the case of a hydroelectric installation, the value of the frequency of mechanical rotation $f_{mech}$ multiplied by the number P of pairs of magnetic poles is between 90% and 110% of the value of the stator frequency $f_{stator}$, or, in an embodiment, between 95% and 105% of the value of the stator frequency $f_{stator}$. In other words, the value of the rotor frequency $f_{rotor}$ is between −10% and 10% of the value of the stator frequency $f_{stator}$, or, in an embodiment, between −5% and 5% of the value of the stator frequency $f_{stator}$.

In the embodiment in FIG. 1, the stator frequency $f_{stator}$ is equal to 50 Hz, the frequency of mechanical rotation $f_{mech}$ is in the order of 48/P hertz, which means that the rotor frequency $f_{rotor}$ is in the order of 2 Hz.

The conversion system 24 comprises a bidirectional converter from alternating current to direct current 34, also called an AC/DC converter, connected to the alternating grid, a bidirectional converter from direct current to alternating current 36, also called a DC/AC inverter, connected between the AC/DC converter and the rotor. The DC/AC inverter 36 comprises controllable electric switches designed to convert direct input voltage into alternating output voltage.

An expert in the field will understand that the AC/DC bidirectional converter 28 functions as a voltage rectifier, and the bidirectional DC/AC inverter 30 functions as a voltage inverter, when the flow of power through the conversion system 24 is directed from the alternating grid 12 to the electric machine 18, that is, when the rotor frequency $f_{rotor}$ is positive.

Inversely, an expert in the field will understand that the DC/AC bidirectional inverter 30 functions as a voltage rectifier and the bidirectional AC/DC converter 28 functions as a voltage inverter, when the flow of power through the conversion system 24 is directed from the electric machine 18 to the alternating grid 12, that is, when the rotor frequency $f_{rotor}$ is negative.

The conversion system 24 also comprises a direct current circulation bus 38 arranged between the AC/DC converter and the DC/AC inverter, and a device 40 for controlling the switches of the DC/AC inverter in accordance with a control law. The DC/AC inverter 36 and the rotor 22 are, for each phase of the alternating voltage, designed to be replaced by the DC/AC inverter with the rotor, connected to each other at a respective intermediate point 28.

The drive train 16 also includes a first sensor 42 for measuring the direct voltage designed to circulate on the direct bus 38 between the AC/DC converter and the DC/AC inverter, and a second sensor 44 for measuring the alternating voltage at the intermediate point 28.

The band-stop filter 26 is designed to attenuate the voltage at each intermediate point 28 for a frequency band corresponding to the frequency of a target interval.

The target interval is between 0.6 times the stator frequency $f_{stator}$ and 1.4 times the stator frequency $f_{stator}$.

In a case where the setup for generating electric power 10 is a wind turbine, the target interval is, in an embodiment, between 0.7 times the stator frequency $f_{stator}$ and 1.3 times the stator frequency $f_{stator}$.

In a case where the setup for generating electric power 10 is a hydroelectric installation, the target interval is, for example, between 0.9 times the stator frequency $f_{stator}$ and 1.1 times the stator frequency $f_{stator}$, or, in an embodiment, between 0.95 times the stator frequency $f_{stator}$ and 1.05 times the stator frequency $f_{stator}$.

The frequency band of the band-stop filter 26 has a lower cut-off frequency more or less equal to the lower limit of the target interval and an upper cut-off frequency more or less equal to the upper limit of the target interval.

In other words, the lower cut-off frequency of the frequency band is equal to 0.6 times the stator frequency $f_{stator}$, or, in an embodiment, equal to 0.7 times the stator frequency $f_{stator}$ in the case of a wind turbine. The lower cut-off frequency is equal to 0.9 times the stator frequency $f_{stator}$, or, in an embodiment, equal to 0.95 times the stator frequency $f_{stator}$ in the case of a hydroelectric setup.

The upper cut-off frequency of the frequency band is equal to 1.4 times the stator frequency $f_{stator}$, or, in an embodiment, equal to 1.3 times the stator frequency $f_{stator}$ in the case of a wind turbine. The upper cut-off frequency is equal to 1.1 times the stator frequency $f_{stator}$, or, in an embodiment, equal to 1.05 times the stator frequency $f_{stator}$ in the case of a hydroelectric installation.

The band-stop filter 26 is a passive filter. The band-stop filter includes several branches 45 connected between the intermediate points 28. Each branch 45 has an electromagnetic coil 46 and a condenser 48 connected in series. Each branch 45 has a resistor 50 connected in parallel to the electromagnetic coil 46. In an embodiment, the branches of the filter do not have a resistor connected in parallel to the electromagnetic coil.

In the embodiment in FIG. 1, the band-stop filter 26 is connected in a triangle and has two branches 45, each being connected between two successive intermediate points 28.

In an embodiment, the band-stop filter 26 is connected in a star and has three branches 45, each being connected between a respective intermediate point 28 and a neutral point.

The AC/DC converter 34, visible in FIG. 1, comprises an input terminal, not shown, for each phase of the alternating current provided by the grid 12, as well as two output terminals and a middle output point, not shown. The AC/DC converter 34 is, for example, a three phase converter and thus comprises three input terminals.

The AC/DC converter 34 has, for example, a known topology of the type clamped by the neutral point, also called NPC topology (from the English Neutral Point Clamped).

In an embodiment, the AC/DC converter 34 has a topology of the type piloted by the neutral point, also called NPP topology (from the English Neutral Point Piloted). The AC/DC converter 34 thus comprises, for each phase of the alternating current, two end branches and a middle branch, also called a transversal branch. Each end branch is connected between a respective input terminal and the corresponding output terminal and has a controllable electronic switch. The middle branch is connected between a respective input terminal and the middle point and has two switches connected in antiseries.

The DC/AC inverter 36 comprises two input terminals and a middle input point, not shown, as well as an output terminal, not shown, for each phase of the alternating current exchanged with the rotor 22. The DC/AC inverter 36 comprises controllable electronic switches designed to convert the direct current supplied by the AC/DC converter 34 to an alternating current delivered to the rotor 22 when the rotor frequency is positive. Inversely, when the rotor frequency is negative, the DC/AC inverter 30 [sic] is designed to convert the alternating current supplied by the rotor 22 to a direct current delivered to the bidirectional AC/DC converter 28, thus working as an inverter.

The DC/AC inverter 36 is, for example, a three-level converter. The DC/AC inverter 36 is, for example, a converter clamped by the neutral point, also called an NPC converter (from the English Neutral Point Clamped). In an embodiment, the DC/AC inverter 36 is a converter piloted by the neutral point, also called an NPP topology (from the English Neutral Point Piloted).

In the example of an embodiment in FIG. 1, the DC/AC inverter 36 is directly connected to the AC/DC converter 34 through the direct current circulation bus 38, in the absence of a braking chopper (from the English Dynamic Braking Chopper, or otherwise DB Chopper) connected to the direct bus 38. The DC/AC inverter 36 is directly connected between the AC/DC converter 34 and the rotor 22, in the absence of a protective device against excess voltage and/or access current (in English crowbar) connected between the intermediate points 28.

The direct bus 38 has continuous UDC voltage between the two output terminals of the AC/DC converter 34, and likewise between the two input terminals of the DC/AC inverter 36.

The control device 40 includes a component 52 for calculating the control law of the switches of the DC/AC inverter, a component 54 for determining the control signals of the switches of the DC/AC inverter in terms of the control law, and a component 56 for applying the control signals to the switches of the DC/AC inverter 36.

The control device 40 comprises an information processing unit, made up, for example, of a data processor linked to a memory. The calculating component 52, the determining component 54 and the application component 56 comprise, for example, software for calculating the control law, software for determining the control signals in terms of the control law and software for applying the control signals to the switches of the DC/AC inverter, respectively. The memory is capable of storing software for calculating the control law, determining the control signals and applying the control signals.

In an embodiment, the calculating component 52, the determining component 54 and the application component 56 are made in the form of dedicated programmable logic circuits.

Thus, the band-stop filter 26 makes it possible to attenuate the voltage at each intermediate point 28 for the frequencies of the target interval around the stator frequency $f_{stator}$.

The occurrence of a short circuit on the alternating grid 12 leads to a significant increase in the induced voltage to rotor 22 of the electric machine, and the alternating voltage to the terminals of the DC/AC inverter 36 of the alternating side increases for the adjacent frequencies of the stator frequency $f_{stator}$. The band-stop filter 26, according to an embodiment, then makes it possible, by attenuation only for the frequencies of the target interval, to limit the increase of the direct voltage of the bus 38 when the alternating voltage increases for the frequencies of the target interval, at the same time not modifying the voltage values for the rotor frequency $f_{rotor}$, in order to maintain control of the rotor 22.

The drive train according to an embodiment thus makes it possible to avoid deterioration of the conversion system 24 when a short circuit occurs on the alternating grid 12, while complying with the rules of the grid 12. Furthermore, the drive train does not require adding an additional active protective device, such as a braking chopper connected to the direct bus 38, or such as a protective device against excess voltage and/or excess current connected between the intermediate points 28, or even such as thyristors connected in anti-parallel between the electric grid 12 and the stator 20 of the machine.

Figure 2:
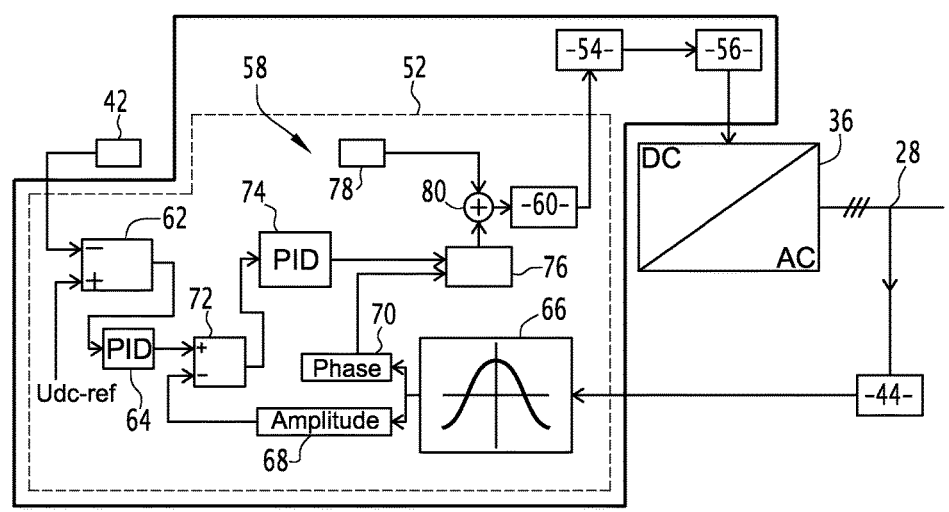
FIG. 2 is a schematic representation of a switch control device for a DC/AC inverter in the drive train of FIG. 1, according to an embodiment of the present invention.

FIG. 2 illustrates a second embodiment of the present invention for which the elements similar to the first embodiment, previously described, are found by identical references and are not described again.

According to the second embodiment, the control law is, in addition to the first embodiment previously described, such that the alternating voltage coming from the DC/AC inverter 36 is, for the frequencies of the target interval, subjected to an amplitude voltage more or less like that of the voltage attenuated at the intermediate point 28 and almost in phase with the voltage coming from the rotor 22.

In the example of the embodiment in FIG. 2, the calculating component 52 comprises first means 58 of calculating a control instruction for the switches of the DC/AC inverter and second means 60 for calculating the control law in terms of the calculated instruction.

The first means of calculating 58 comprise a first subtractor 62 connected to the first measurement sensor 42, on the one hand, and designed to receive the value of the UDC direct reference voltage, on the other.

The first means of calculating 58 also comprise a first regulator 64 connected at the output of the first subtractor 62, a band-stop filter 66 connected to the second sensor 44, means 68 for determining the amplitude of a signal and means 70 for determining the phase of the signal, the means of determining the amplitude 68 and the means of determining the phase 70 being connected to the output of the band-stop filter 66.

The first means of calculating 58 comprise a second subtractor 72 connected to the output of the first regulator 64, on the one hand, and to the output of the means for determining the amplitude 68, on the other hand. The first means of calculating 58 also comprises a second regulator 74 connected to the output of the second subtractor 72, as well as the first means 76 for determining the control instruction for the frequencies of the target interval, the first means of determining the instruction 76 being connected to the outputs of the second regulator 74 and means of determining the phase 70.

The first means of calculating 58 also comprise second means 78 for determining the instruction for controlling the rotor frequency $f_{rotor}$ and an adder 80 connected to the outputs of the first and second means of determining instructions 76, 78.

The first subtractor 62 is designed to calculate the error between the direct voltage measured by the first sensor 42 and the value of the UDC reference direct voltage.

The first regulator 64 is, for example, a proportional integral derivative regulator, also called a PID regulator. The first regulator 64 is thus designed to determine a correction of the direct voltage in terms of the UDC reference voltage.

The first subtractor 62 and the first regulator 64 make up the means of servo-control of the direct voltage of the direct bus 38.

The band-stop filter 66 is designed to select the signal of the alternating voltage at the intermediate point 28 coming from the second sensor 44 for a band of frequencies corresponding to the frequencies of the target interval, and to attenuate said signal of the alternating voltage for frequencies outside the frequency band. The frequency band of the band-stop filter 66 thus has a lower cut-off frequency more or less equal to the lower limit of the target interval, and an upper cut-off frequency more or less equal to the upper limit of the target interval.

In other words, the lower frequency cut-off of the frequency band is equal to 0.6 times the stator frequency $f_{stator}$, or, in an embodiment, equal to 0.7 times the stator frequency $f_{stator}$ in the case of a wind turbine. The lower cut-off frequency is equal to 0.9 times the stator frequency $f_{stator}$, again, in an embodiment, equal to 0.95 times the stator frequency $f_{stator}$ in the case of a hydroelectric installation.

The upper cut-off frequency of the frequency band is equal to 1.4 times the stator frequency $f_{stator}$, or, in an embodiment, equal to 1.3 times the stator frequency $f_{stator}$ in the case of a wind turbine. The upper cut-off frequency is equal to 1.1 times the stator frequency $f_{stator}$, again, in an embodiment, equal to 1.05 times the stator frequency $f_{stator}$ in the case of a hydroelectric setup.

The band-stop filter 66 is, for example, a filter of the second order.

The means for determining the amplitude 68 are designed to determine the amplitude of the alternating voltage at the intermediate point 28 for the frequencies of the target interval.

The means for determining the phase 70 are designed to determine the phase of the alternating voltage at the intermediate point 28 for the frequencies of the target interval, so that the signal delivered by the DC/AC inverter corresponding to the control instruction are in phase with the voltage coming from the rotor 22.

The second subtractor 72 is designed to calculate the error between the amplitude of the alternating voltage at the intermediate point 28 obtained by the means of determining the amplitude 68 and the voltage correction coming from the first regulator 64.

The second regulator 74 is, for example, a proportional integral derivative regulator, also called a PID regulator. The second regulator 74 is thus designed to determine a correction of amplitude of the alternating voltage, in terms of the alternating voltage measured by the second sensor 44 and the voltage correction coming from the servo-control of the voltage of the direct bus 38.

The first means of determining the instruction 76 are thus designed to determine the control instruction of the DC/AC inverter for the frequencies of the target interval in terms of the correction of amplitude coming from the second regulator 74 and the phase determined by the means of determining the phase 70, so that the alternating voltage coming from the DC/AC inverter is in phase with the voltage coming from the rotor 22.

The band-pass filter 66, the means for determining the amplitude 68, the means for determining the phase 70, the second subtractor 72, the second regulator 74 and the first means for determining the instruction 76 make up the means of servo-control in amplitude and in phase, for the frequencies of the target interval, of the alternating voltage delivered by the DC/AC inverter 36 to the intermediate point 28.

The adder 80 is designed to add the control instruction for the frequencies of the target interval delivered by the first means of determining the instruction 76 with the instruction for the rotor frequency $f_{stator}$, in order to determine the control instruction for the entire frequency spectrum delivered to the second means of calculation 60.

The second means 60 are thus designed to calculate the control law in terms of the instruction coming from the adder 80.

The second embodiment works in a way similar to that of the first embodiment.

The band-stop filter 26 makes it possible to attenuate the voltage at each intermediate point 28 for the frequencies of the target interval around the stator frequency $f_{stator}$, and the control law of the DC/AC inverter 36 is also such that the alternating voltage delivered by the DC/AC inverter 36 is, for the frequencies of the said target interval, all the amplitude time more or less equal to that of the voltage attenuated at the intermediate point 28 and almost in phase with the voltage coming from the rotor 22.

The band-stop filter 26 and the control law of the DC/AC inverter according to the second embodiment then make it possible to limit the increase in the direct voltage of the bus 38 when the alternating voltage increases for the frequencies of the target interval, following the occurrence of a short circuit on the alternating grid 12. The band-stop filter 26 and the control law of the DC/AC inverter do not change the voltage values for the frequencies around the rotor frequency $f_{rotor}$, in order to maintain their control of the rotor 22.

The drive train according to the second embodiment of the present invention thus makes it possible to prevent deterioration of the conversion system 24 when a short circuit occurs on the alternating grid 12, while complying with the rules of the grid 12.

The control law of the DC/AC inverter according to the second embodiment also makes it possible to have, for the frequencies of the target interval, alternating voltage delivered by the DC/AC inverter more or less equal in amplitude and phase to the voltage coming from the rotor 22, in such a way that the current at the intermediate points 28 is of low intensity for the frequencies of the said target interval. The DC/AC inverter is thus additionally protected according to the second embodiment of the present invention.

The other advantages of the second embodiment are identical to those of the first embodiment and are not, therefore, described again.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A drive train configured for connecting an electric machine to a multiphase electric grid, the electric machine including a rotor connected to the drive train and a stator directly connected to the multiphase electric grid, the drive train comprising:
   an AC/DC converter having a first port configured for coupling to the multiphase electric grid;
   a DC/AC inverter comprising: (i) a first port coupled to a second port of the AC/DC converter via a direct bus, (ii) a second port coupled to the rotor wherein the DC/AC inverter and the rotor being directly connected to each other at an intermediate point for each phase of the multiphase electric grid, and (iii) electronic switches configured to converter direct voltage of the direct bus into alternating voltage;
   a control device configured to control the electronic switches, to control the direct voltage of the direct bus, and
   a band-stop filter coupled to the rotor, the band-stop filter and the rotor being coupled to the DC/AC inverter at the intermediate points;
   wherein the band-stop filter is configured to only attenuate an alternating voltage at the intermediate points for a target interval associated with a stator frequency of the stator, and upon attenuation, the alternating voltage is measured at an output the DC/AC inverter and the control device being connected between the output and the direct bus performs control to limit any increase of the direct voltage of the direct bus when the alternating voltage increases for frequencies of the target interval, and while maintaining a voltage value of a voltage associated with a rotor frequency of the rotor; and wherein during a short circuit of the multiphase electric grid, a magnetic field of the stator becomes constant as the rotor is rotating close to an electric grid frequency and as the band-stop filter attenuates the alternating voltage, minimal power is delivered by the electric machine so that an inertia of the rotor maintains the rotor frequency during the short circuit.

2. The drive train according to claim 1, wherein the target interval is between 0.7 times the stator frequency and 1.3 times the stator frequency.

3. The drive train according to claim 2, wherein the band-stop filter is a passive filter.

4. The drive train according to claim 2, wherein the alternating voltage coming from the DC/AC inverter is, for the frequencies of the target interval, subjected to amplitude voltage more or less equal to that of the attenuated alternating voltage at the intermediate point and more or less in phase with the voltage coming from the rotor.

5. The drive train according to claim 2, wherein the DC/AC inverter is directly connected to the AC/DC converter by direct bus, in an absence of a braking chopper connected to the direct bus.

6. The drive train according to claim 2, wherein the DC/AC inverter is directly connected between the AC/DC converter and the rotor, in an absence of a protection device against excess voltage and/or excess current connected between the intermediate points.

7. The drive train according to claim 3, wherein the band-stop filter comprises a plurality of branches, each branch comprising an electromagnetic coil and a condenser connected in series.

8. The drive train according to claim 4, further comprising a first sensor configured to measure a direct voltage between the AC/DC converter and the DC/AC inverter, and a second sensor configured to measure the attenuated alternating voltage at the intermediate point, the DC/AC inverter and the rotor being, for each phase of the attenuated alternating voltage, connected to each other at the intermediate point, wherein the control device comprises a servo-controller configured to servo-control, for the frequencies of the target interval, the alternating voltage coming from the DC/AC inverter.

9. The drive train according to claim 7, wherein each branch further comprises a resistor connected in parallel to each electromagnetic coil.

* * * * *